April 23, 1957  L. C. DERMOND  2,789,544
FLUID MOTOR
Filed Feb. 10, 1954  3 Sheets-Sheet 1

INVENTOR.
Lawrence C. Dermond
BY Craig V. Morton
His Attorney

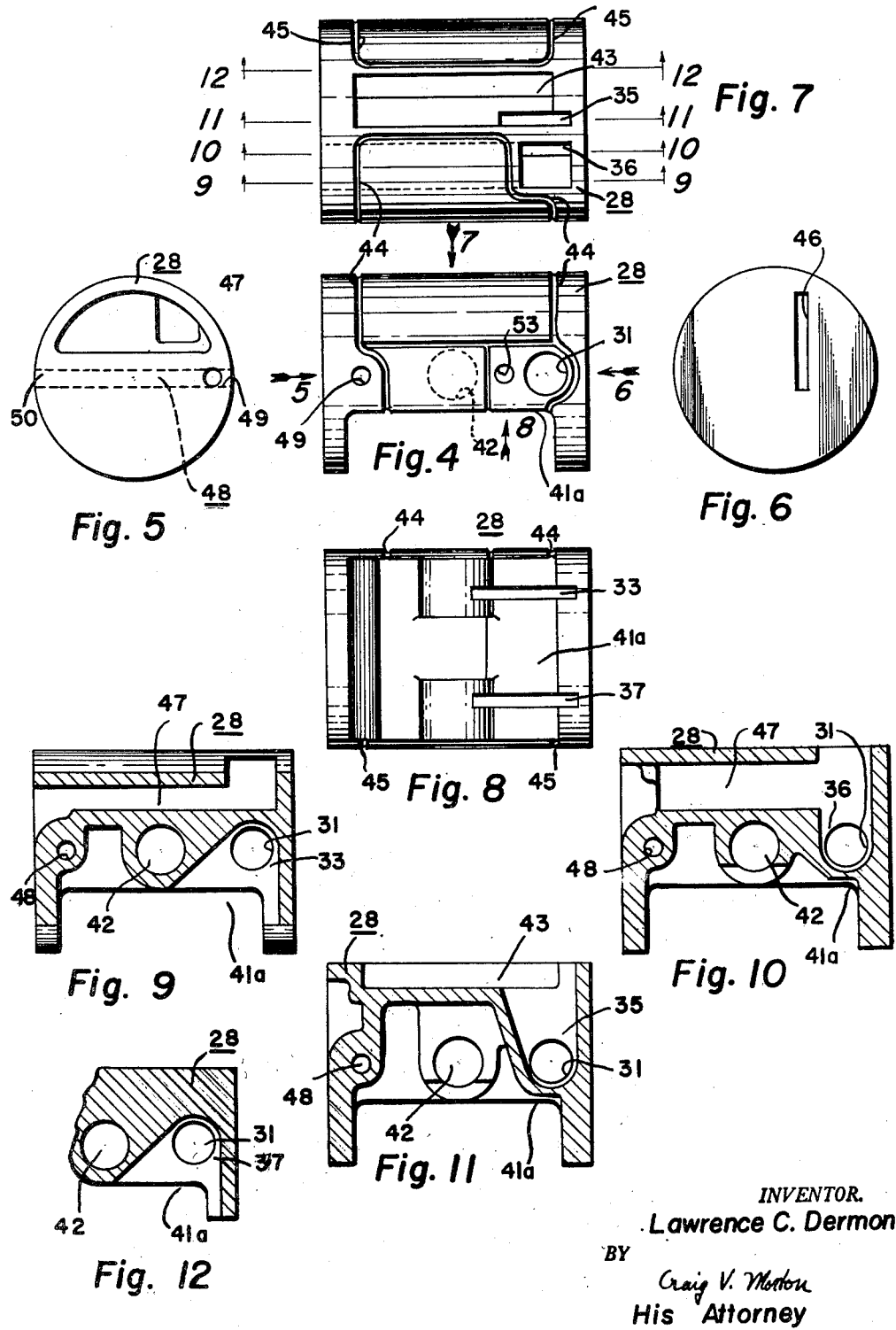

April 23, 1957 L. C. DERMOND 2,789,544
FLUID MOTOR
Filed Feb. 10, 1954 3 Sheets-Sheet 3

INVENTOR.
Lawrence C. Dermond
BY
Craig V. Morton
His Attorney

United States Patent Office 2,789,544
Patented Apr. 23, 1957

2,789,544

FLUID MOTOR

Lawrence C. Dermond, Rochester, N. Y., assignor to General Motors Corporation, Detroit, Mich., a corporation of Delaware Application February 10, 1954, Serial No. 409,332

5 Claims. (Cl. 121—123)

This invention pertains to fluid motors, and particularly to fluid pressure operated motors adapted for actuating vehicle windshield wipers.

The majority of fluid motors for actuating windshield wipers are of the oscillating vane type. That is, most present day wiper motors include a semi-cylindrical housing having disposed therein an oscillatory vane type piston, which piston mechanically actuates suitable reversing valve mechanism for maintaining the vane piston in a state of continuous oscillation during motor operation. Consequently, the reversing valve mechanism in this type of motor is of a rather complicated and intricate design. This invention relates to a fluid motor having a lineally movable piston, and servo controlled reversing valve means for maintaining the piston in a state of continuous reciprocation during motor operation. This arrangement enables the use of greatly simplified reversing valve means. Accordingly, among my objects are the provision of a fluid motor particularly adapted for actuating windshield wipers including means for controlling the speed of motor operation; the further provision of a fluid motor having a reciprocable piston wherein the reversing valve means are carried by the piston; the further provision of a fluid motor having a reciprocable piston including means for minimizing the transversely acting pressure forces on the piston so as to minimize piston wear; the further provision of means for converting reciprocation of a piston into oscillation of a driven member; and the still further provision of a fluid motor including a shuttle type reversing valve, and means to prevent operation of the shuttle valve so as to increase the piston stroke for parking wiper blades out of the normal wiping range.

The aforementioned and other objects are accomplished in the present invention by employing a servo actuated shuttle valve which is movable with the piston, the shuttle valve constituting the reversing valve means for maintaining the piston in a state of continuous reciprocation during motor operation. Specifically, the motor includes a cylinder having disposed therein a reciprocable piston capable of fluid pressure actuation in both directions. It is to be understood that the fluid used for actuating the motor of this invention may be a liquid, or a gas, and reference hereinafter to a liquid under pressure, is only by way of example, and is not to be construed as a limitation.

The cylinder is formed with a bearing surface for rotatably supporting an oscillatable driven shaft. The driven shaft is operatively connected with the piston so that piston reciprocation imparts oscillation thereto, the operative interconnection being constituted by a radial arm, attached to the driven shaft, and having sliding connection with a rotatably supported trunnion carried by and movable with the piston. Moreover, as the linear stroke of the piston can be varied, it will be appreciated that the amplitude of oscillation imparted to the driven shaft may also be varied.

The piston is formed with a diametrically extending through bore adjacent one end thereof, which through bore constitutes a guide for a shuttle valve. The shuttle valve, as aforementiond, constitutes the reversing valve means for the fluid motor. Thus, the valve guide is formed with a supply port, a pair of control ports, and a pair of drain ports. The shuttle valve element, per se, comprises a plunger having a plurality of spaced lands, which are separated by annular channels, the two end lands of the shuttle valve constituting pressure responsive surfaces, by virtue of which the shuttle valve may be reciprocated.

The drain ports of the shuttle valve guide are connected by internal piston passages to a relieved portion of the piston periphery, which relieved portion is always in communication with a drain passage and port of the cylinder. Similarly, the supply port is connected by an internal piston passage to a second relieved portion of the piston periphery that is located diametrically opposite the relieved portion for the drain ports. This second relieved peripheral piston portion is always in communication with a pressure supply passage of the cylinder. As the piston divides the cylinder into two chambers, each control port of the valve guide is connected by internal piston passages, which terminate in openings on opposite end surfaces of the piston, and, thus, each control port is connected to one of the cylinder chambers. In addition, the peripheral surface of the piston is formed with a pair of drain grooves extending proximate the relieved peripheral portion in communication with the pressure supply, in order to reduce the transverse pressure exerted on the piston and minimize uneven piston wear. These grooves provide partial hydraulic radial balance.

The cylinder is also formed with a second valve guide having disposed therein a manually reciprocable control valve. The manually operable valve includes a throttling surface for controlling motor speed by controlling the rate of fluid flow between a pressure supply port and the pressure supply passage of the cylinder. This second valve guide is connected to a cylinder passage for controlling the servo actuation of the shuttle valve. This shuttle valve passage is alternately aligned with piston passages for communicating pressure fluid to the pressure responsive surfaces of the shuttle valve adjacent each end of the normal working stroke of the piston. Thus, periodic movement is imparted to the shuttle valve for reversing the pressure and drain connections for the cylinder chambers so as to maintain the piston in a state of continuous reciprocation during motor operation.

When the manually operable control valve is positioned in the "off" position, one piston passage for effecting servo actuation of the shuttle valve in one direction is blocked, thereby enabling the stroke of the piston to be increased for parking wiper blades out of the normal wiping range. Moreover, by blocking one of the shuttle valve passages, the piston will come to rest in the "parked" position. The piston is maintained in the "parked" position under the urge of pressure fluid, inasmuch as when the manually operable control valve is in the "off" position, pressure fluid is applied to the pressure supply port of the shuttle valve guide. Thus, the manually operable control valve may be moved to the "off" position at any time irrespective of the position of the piston within the cylinder, and the piston will always complete its normal cycle and come to rest in the predetermined "parked" position.

Further objects and advantages of the present invention will be apparent from the following description, reference being had to the accompanying drawings wherein a preferred embodiment of the present invention is clearly shown, and wherein similar reference characters denote similar parts throughout the several views.

In the drawings:

Fig. 4 is a side view, in elevation, of the piston.

Figs. 5, 6, 7 and 8 are views, in elevation, respectively, of the end surfaces of the piston, and the top and bottom surfaces of the piston as taken in the direction of arrows 5, 6, 7 and 8 of Fig. 4.

Figs. 9, 10 and 11 are sectional views taken along lines 9—9, 10—10, and 11—11 of Fig. 7.

Fig. 12 is a fragmentary sectional view taken along the line 12—12 of Fig. 7.

Figure 13:
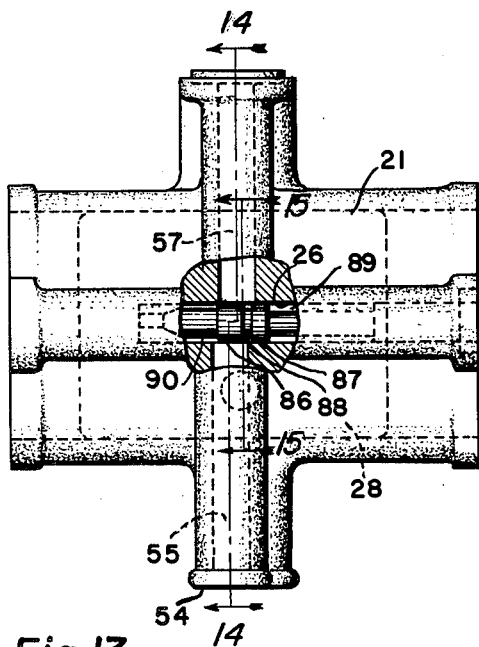

Fig. 13 is a top view, partly in elevation and partly in section, of the cylinder.

Figure 14:
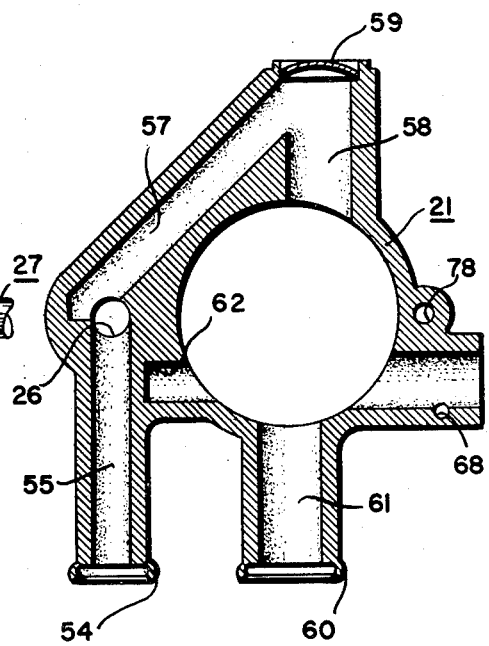

Fig. 14 is a sectional view of the cylinder with certain parts removed, taken along line 14—14 of Fig. 13.

Figures 15, 16:
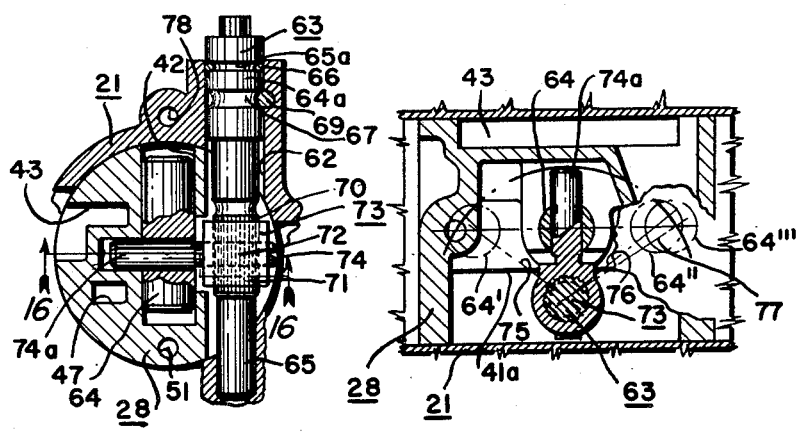

Fig. 15 is a fragmentary sectional view taken along line 15—15 of Fig. 13.

Fig. 16 is a fragmentary sectional view taken along line 16—16 of Fig. 15, and indicating the normal working stroke of the oscillating shaft and the "parked" position thereof.

Figure 1:
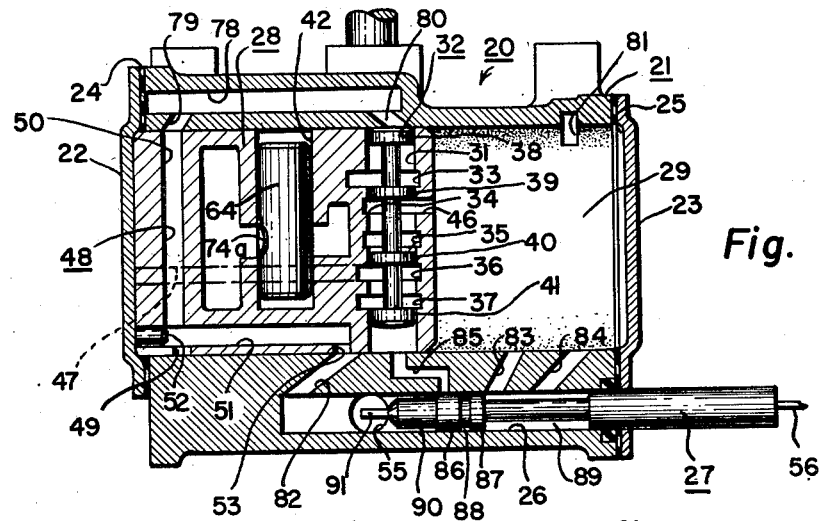
Fig. 1 is a view, partly in section and partly in elevation of the fluid motor of this invention with the piston depicted at one end of its normal working stroke, and the control valve in the high speed position.

With reference to Fig. 1, a fluid motor 20 is shown including a cylinder 21 having a through bore, opposite ends of which are closed by cap members 22 and 23, respectively. Suitable sealing means, in the form of gaskets 24 and 25, are interposed between engaging surfaces of the cap members 22 and 23 to form a fluid-tight joint therebetween, the cap members 22 and 23 being attached to the cylinder 21 by any suitable means, such as screw devices, not shown. The cylinder 21 is also formed with a longitudinally extending cylinder recess 26, which constitutes a valve guide for a manually reciprocable control valve 27.

Figure 2:
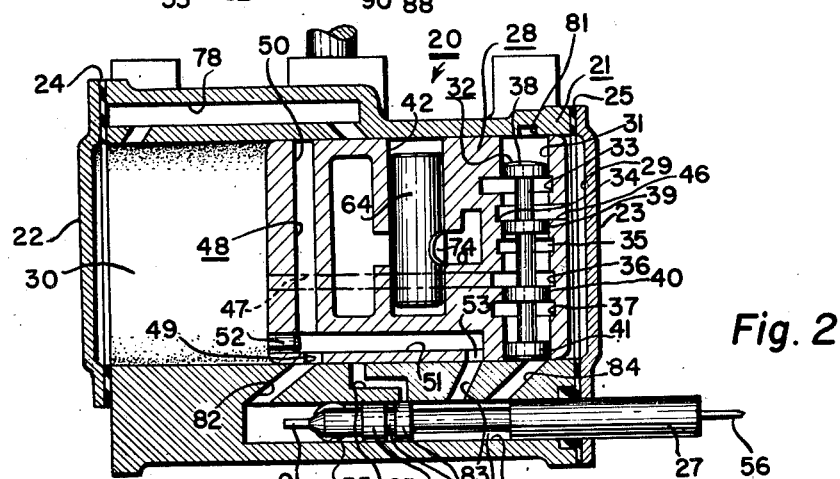
Fig. 2 is a view similar to Fig. 1 with the piston at the other end of its normal working stroke, and the control valve in the low speed position.

With reference to Figs. 1 and 2, the cylinder has disposed therein a reciprocable piston 28 capable of fluid pressure actuation in both directions. As is seen particularly in Fig. 2, the piston 28 divides the cylinder bore into two chambers 29 and 30. As may be seen in Figs. 1 through 3, the piston 28 is formed with a diametrically extending through bore 31 adjacent one end thereof, which through bore constitutes a guide for a shuttle valve 32. As will be more particularly described hereinafter, the shuttle valve 32 constitutes the reversing valve means for the fluid motor, and is automatically operable to maintain the piston 28 in a state of continuous reciprocation between the piston positions depicted in Figs. 1 and 2, during motor operation. The valve guide 31 is formed with a plurality of grooves 33, 34, 35, 36 and 37. Grooves 33 and 37 constitute drain ports for the valve guide 31; grooves 34 and 36 constitute control ports for the valve guide; and groove 35 constitutes a supply port for the valve guide.

Figure 3:
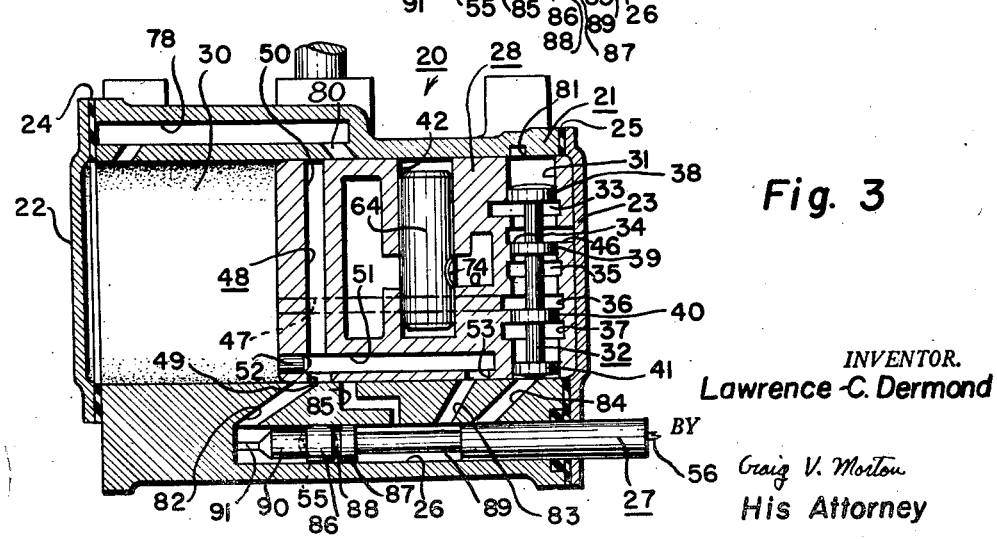
Fig. 3 is a view similar to Fig. 1 with the piston in the "parked" position, and the control valve in the "off" position.

The shuttle valve 32 comprises a plunger element having a plurality of spaced lands 38, 39, 40 and 41, which lands are separated by annular grooves, as shown in Figs. 1 through 3. The lands 38 through 41 are snugly received by the valve guide 31, and the end lands 38 and 41 constitute pressure responsive surfaces by virtue of which the shuttle valve 32 may be reciprocated relative to the piston 28 by pressure fluid.

With particular reference to Figs. 8, 9 and 12, it may be seen that groove 33 constituting one of the drain ports for the shuttle valve guide 31 communicates with a relieved portion of the piston periphery 41a, while the groove 37 constituting another drain port for the valve guide 31 also communicates with the relieved peripheral piston portion 41a. Moreover, as is shown in Figs. 9 through 12, the piston is formed with a transversely arranged cylindrical recess 42, the function of which will be described more particularly hereinafter.

The groove 35, constituting the supply port for the shuttle valve guide 31, communicates with a relieved peripheral portion 43 of the piston, as is shown in Fig. 7. The relieved peripheral portion 43 is located substantially diametrically opposite the relieved piston portion 41a. Furthermore, inasmuch as relieved portion 43 is subjected to pressure fluid while the relieved portion 41a is connected to drain, as will appear more fully hereinafter, the piston periphery is formed with drain channels 44 and 45, which drain channels are located in contiguous relation to the relieved portion 43, so as to reduce the transverse pressure exerted on the piston by the pressure fluid, and thereby minimize uneven piston wear during reciprocation in the cylinder. Thus, substantially the entire peripheral surface of the piston is connected to drain, and the channels 44 and 45 tend to balance the transverse, or radial, forces exerted on the piston by reason of the relieved portion 43 being subjected to pressure fluid.

The groove 34 of the valve guide 31, constituting a control port is connected by a piston passage 46, and as is shown in Figs. 1 through 3, communicates with cylinder chamber 29. Groove 36, which constitutes the other control port of the valve guide 31 connects with an internal piston passage 47, as is shown in Figs. 1 through 3, passage 47 having communication with cylinder chamber 30.

With reference to Figs. 1 through 5 and 9 through 11, the piston 28 is also formed with a diametrically extending internal passage 48, one end of which terminates in a peripheral piston opening 49 and the other end of which terminates in a peripheral piston opening 50. The passage 48 also connects with a longitudinally extending passage 51, the end of which is closed by a plug 52. Passage 51 also connects with a peripheral piston opening 53. The functions of the piston passages 48 and 51, as well as the peripheral piston openings 49, 50 and 53 will be described hereinafter. With particular reference to Figs. 13 and 14, it may be seen that the cylinder 21 is formed with a pressure supply port 54, which connects with a pressure supply passage 55 having communication with a longitudinally extending recess 26, which constitutes a guide for a manually operable control valve, to be described. The valve guide 26, in turn, communicates with a cylinder passage 57, the passage 57 connecting with a passage 58. As is seen in Fig. 14, the passage 58 connects with the cylinder bore, and the other end thereof is closed by a suitable cap member 59. The cylinder 21 is also formed with a drain port 60 having communication with a drain passage 61, which connects with the cylinder bore. The cylinder 21 is also formed with a transversely extending stepped bore 62, which intersects the through bore of the cylinder.

With reference to Figs. 15 and 16, the manner in which the piston 28 is restrained against rotation relative to the cylinder 21, as well as the means employed to convert reciprocation of the piston into oscillation of a driven shaft 63, will be described. As heretofore mentioned, the piston 28 is formed with a transversely extending bore 42, within which a trunnion 64 having a diametrically extending opening, is rotatably supported. The stepped bore 62 of the cylinder 21 constitutes a bearing surface for journaling the oscillatable driven shaft 63, which is formed with complementary stepped portions 64a and 65. The shaft 63 is also formed with an annular groove 65a within which sealing means in the form of an O-ring 66 is disposed. The shaft is further formed with a second annular groove 67, which is aligned with a transverse passage 68 that intersects the stepped bore 62, and into which a thrust pin 69 is inserted so as to locate the shaft 63 and preclude axial movement thereof relative to the cylinder 21. The shaft 63 is further formed with a pair of axially spaced, longitudinally serrated peripheral portions 70 and 71, which serrated portions are separated by an annular groove 72. The serrated portions 70 and 71 are adapted to receive an internally serrated portion of a drive lever or arm 73 having a radial threaded opening within which a set screw 74 is disposed, the set screw 74 having engagement with the groove 72 so as to preclude relative longitudinal movement between the shaft 63 and the drive lever 73.

As is seen in Figs. 15 and 16, the drive lever 73 includes a radially extending pin 74a, which projects into the diametrically extending opening of the trunnion 64, thus locating the trunnion 64 within the piston 28. Moreover, by virtue of the fact that the piston 28 moves in a straight line, the trunnion 64 will, likewise, move in a straight line relative to the cylinder. Thus, during movement of the trunnion 64 to the dotted line position 64', in Fig. 16, the drive lever 73 and the shaft 63 will be rotated to the angular position indicated by line 75, during which time the pin 74a will slide in the opening of the trunnion 64. Similarly, when the trunnion 64 is moved to the position indicated by dotted line 64", the drive lever 73 and the shaft 63 will be rotated to a position indicated by line 76. The lines 75 and 76 define the limits of the normal oscillatory amplitude imparted to the shaft 63 during reciprocation of the piston 28 between the positions shown in Fig. 1 and Fig. 2. However, when the piston 28 is moved to the position of Fig. 3, the trunnion 64 will assume the position indicated by dotted line 64''' in Fig. 16, whereupon the shaft 63 and the drive lever 73 will be located to a position indicated by line 77. In this manner, the amplitude of oscillation imparted to the driven shaft 63 is increased so as to facilitate parking wiping blades, not shown, out of the normal wiping stroke.

Referring again to Figs. 1 through 3, the cylinder 21 is also formed with a longitudinally extending passage 78 having an opening 79 adjacent one end thereof and an opening 80 adjacent the other end thereof, which openings communicate with the cylinder through bore. In addition, the cylinder 21 is formed with a passage 81 having communication with the cylinder through bore and the drain passage 61. The valve guide 26 is connected with the cylinder through bore by way of three passages 82, 83 and 84. Moreover, the cylinder 21 is further formed with a passage 85, which communicates with the cylinder through bore, the valve guide 26 and the drain passage 61.

The manually operable control valve 27, which is mounted for reciprocable movement within the valve guide 26 by any suitable means, such as a Bowden wire 56, is formed with a pair of spaced lands 86 and 87, which are separated by an annular groove 88. The valve 27 is further formed with a second annular groove 89. In addition, the valve 27 is formed with a throttling surface 90 and a pin extension 91, which limits inward movement of the valve 27 as depicted in Fig. 3. The throttling surface 90 is arranged to control the flow of pressure fluid from cylinder passage 55 to cylinder passage 57, as shown in Fig. 14, and in so doing the valve 27 controls the operating speed of the motor. The valve 27 is shown in the full speed "on" position in Fig. 1, the slow speed "on" position in Fig. 2, and in the "off" position in Fig. 3.

By reason of the piston being interconnected with the shaft 63 as described hereinbefore, the piston 28 is orientated in the cylinder 21 so that the supply passage 58 is always in communication with the relieved peripheral piston portion 43, as shown in Fig. 7. Moreover, by piston orientation in the cylinder, the drain passage 61 is always in communication with the relieved peripheral piston portion 41, as seen in Figs. 4 and 8. Thus, the relieved piston portion 41 is always connected to the drain port 60 irrespective of the position of the piston 28 within the cylinder. Moreover, irrespective of the position of control valve 27 within the valve guide 26, the passages 55 and 57 are always interconnected, the position of valve 27 only controlling the rate of fluid flow between passages 55 and 57. Moreover, by reason of the throttling surface 90 of the valve 27, the passage 82 of the cylinder is always connected to the passage 55 and, thus, is always subjected to pressure fluid.

*Operation*

Operation of the fluid motor 20 is as follows. Assuming the control valve 27 to be in the "off" position, as depicted in Fig. 3, a complete cycle of motor operation will be described. When the valve 27 is in the "off" position, fluid pressure supply passage 55 communicates with valve guide 26 by reason of the under cut throttling surface 90. Thus, pressure fluid is applied to cylinder passage 82 through port 49 to piston passage 51, through piston opening 53 to cylinder passage 83 to the groove 89 of the valve 27, and then to drain passage 85. By reason of passage 84 being blocked from communication with groove 89, pressure fluid cannot be applied to the shuttle valve guide 31. Hence, the shuttle valve 32 will remain in the position shown in Fig. 3. When the valve 27 is in the "off" position, the pressure supply passage 55 also communicates with cylinder passage 57, as shown in Fig. 13, inasmuch as the annular groove 88 of the valve 27 is disposed in alignment with the passages 55 and 57. Moreover, the passages 55 and 57 are so located in the cylinder 21, as seen in Fig. 13, that irrespective of the position of valve 27 within the guide 26, these passages will be interconnected. This arrangement is achieved by virtue of the fact that valve land 86 is of less width than the diameter of either passage 55 or 57. Accordingly, pressure fluid will be applied to passage 58 and, thence, to relieved piston portion 43 to supply port 35 of the shuttle valve 32. Inasmuch as the shuttle valve remains in the position depicted in Fig. 3, port 36 will be connected with pressure fluid, while port 34 will be connected to drain through channel 33. Thus, cylinder chamber 30 has applied thereto pressure fluid through passage 47, while cylinder chamber 29 is connected to drain through passage 46, relieved piston portion 41, cylinder passage 61 and the drain port 60. Thus, the piston 28 will remain in the "parked" position as long as valve 27 remains in the "off" position.

However, as soon as valve 27 is moved to the right, as viewed in Fig. 3, to the position of Fig. 2, where cylinder passages 83 and 84 are interconnected by channel 89, and valve guide 26 is blocked from passage 85 by land 87, the motor will operate as follows. Inasmuch as cylinder passages 55 and 57 are interconnected through the throttling surface 90 of the valve pressure, fluid will still be admitted to the supply port 35 of the shuttle valve. Moreover, since pressure fluid is being applied to cylinder passage 83, when passage 84 communicates with groove 89, pressure fluid will be applied through the passage 84 to the shuttle valve guide 31 beneath shuttle valve land 41. Inasmuch as the shuttle valve guide 31 above shuttle valve land 38 is connected to drain passage 61 through cylinder passage 81 and piston groove 41a, the shuttle valve 32 will be servo actuated and move from the position shown in Fig. 3 to the position shown in Fig. 1. The shuttle valve 32 in moving from the position of Fig. 3 to the position of Fig. 1 reverses the connections of the cylinder chambers 29 and 30 with respect to pressure and drain, and, accordingly, cylinder chamber 29 will have applied thereto pressure fluid through passage 46 from shuttle valve port 34. At the same time, cylinder chamber 30 will be connected to drain through piston passage 47 and shuttle valve ports 36 and 37, which are then interconnected. Thus, the piston 28 will move from the position depicted in Fig. 3 to the position depicted in Fig.

1, during which linear movement, the shaft 63 will be rotated throughout the angle between lines 77 and 75, as shown in Fig. 16. As the piston 28 moves from the right from the position of Fig. 3 to the position of Fig. 1, and adjacent the end of this stroke, piston port 50 will move into communication with cylinder opening 79. At the same time, piston passage 50 having connection with piston passage 51 will be connected to cylinder passage 82, which connects with the valve guide 26, whereupon pressure fluid will be applied to cylinder passage 78 to the cylinder opening 80, which communicates with the shuttle valve guide 31 on the top surface of shuttle valve land 38. Concurrently therewith the shuttle valve guide 31 will be positioned in alignment with cylinder passage 85, which is connected to drain passage 61 through piston groove 41a, whereupon the shuttle valve 32 will be servo actuated to move downwardly from the position shown in Fig. 1 to the position in Fig. 2. This shuttle valve movement again reverses the pressure and drain connections to cylinder chambers 29 and 30, so that chamber 29 is now connected to drain and chamber 30 is connected to pressure fluid. Consequently, the piston 28 will move to the right from the position of Fig. 1 to the position of Fig. 2 whereupon the shuttle valve will again be servo actuated to move upwardly from the position shown in Fig. 2 to the position shown in Fig. 1. Consequently, during motor operation with the valve 27 in the "on" position, the piston 28 will be maintained in a state of continuous reciprocation between the positions depicted in Figs. 1 and 2. Thus, during motor operation, the shaft 63 will have imparted thereto an oscillatory motion throughout the angle between lines 75 and 76, as shown in Fig. 16.

From the foregoing, it is apparent that the shuttle valve 32 constitutes a reversing valve means for maintaining the piston 28 in a state of continuous reciprocation during motor operation. Moreover, as heretofore alluded to, the position of the control valve 27 will determine the operating motor speed by throttling the flow of pressure fluid between passages 55 and 57, which throttling is effected by valve surface 90. Moreover, in actual installation, the shuttle valve element 32 is located so that gravity acts at right angles to the longitudinal axis thereof. In this manner, the shuttle valve will remain in its servo actuated position during piston movement, and will only be capable of movement by servo actuation in the reverse direction.

When the control valve 27 is moved to the "off" position, as shown in Fig. 3, the piston 28 will be moved to the "parked" position in the following manner. By virtue of the fact that the passages 55 and 57 are always interconnected, and by virtue of the fact that cylinder passage 82 is always subjected to pressure fluid, irrespective of the position of control valve 27, the control valve 27 can be moved to the "off" position at any time. Thus, if the control valve 27 is moved to the "off" position when the piston 28 is in the position depicted in Fig. 2, the piston 28 will make one complete reciprocative movement before arriving at the parked position. However, if the piston 28 is in the position depicted in Fig. 1, the piston will only make a half cycle of reciprocative movement before arriving at the parked position. Thus, when the control valve 27 is moved to the "off" position, communication between cylinder passages 83 and 84 is blocked, and channel 89 is connected to drain through passages 85 and 61. However, inasmuch as pressure fluid is still admitted to the shuttle valve supply port 35, as well as to the cylinder passage 82, the piston 28 will continue its linear travel until it is moved to the position shown in Fig. 3, at which time, it will come to rest since the shuttle valve cannot be servo actuated to reverse the pressure and drain connections to cylinder chambers 29 and 30. Thus, the application of pressure fluid to cylinder chamber 30, while cylinder chamber 29 is connected to drain will maintain the piston 28 in the "parked" position.

From the foregoing, it is manifest that the present invention embodies a fluid motor including a reciprocable piston that carries servo actuated reversing valve means for maintaining the piston in a state of continuous reciprocation. Moreover, the present invention embodies a fluid motor for actuating wiper blades wherein the wiper blades may be moved to a parked position outside of the normal wiping range and retained in such position by fluid pressure. In addition, the present invention includes simplified means for converting reciprocation of a piston into oscillation of a driven shaft.

While the embodiment of the present invention as herein disclosed, constitutes a preferred form, it is to be understood that other forms might be adopted.

What is claimed is as follows:

1. A fluid motor including in combination, a cylinder, a reciprocable piston disposed in the cylinder capable of fluid pressure actuation in both directions, and a shuttle valve carried by said piston and capable of fluid pressure actuation in both directions relative to said piston, said shuttle valve controlling the application of pressure fluid to said cylinder on opposite sides of said piston so as to effect continuous piston movement, said cylinder having a pressure supply passage and a drain passage having communication with said piston and said shuttle valve irrespective of the position of the piston within the cylinder, said piston being formed with diametrically opposed relieved portions having communication with the pressure supply and drain passages of the cylinder, said piston also having peripheral drain channels disposed in contiguous relation to the relieved piston portion which communicates with the pressure supply passage whereby the transversely acting pressure forces on said piston are reduced to a minimum.

2. A fluid motor including in combination, a cylinder, a reciprocable piston disposed in said cylinder capable of fluid pressure actuation in both directions, a shuttle valve carried by said piston and capable of fluid pressure actuation in both directions relative to said piston, said shuttle valve controlling the application of pressure fluid to said cylinder on opposite sides of said piston so as to effect continuous piston movement, said cylinder having a presure supply passage, a drain passage and a valve guide connection with said pressure supply passage, said shuttle valve having communication with said pressure supply and drain passages irrespective of the position of the piston within the cylinder, and a manually operable valve disposed in said valve guide for controlling motor operation by throttling the rate of fluid flow through said pressure supply passage, said shuttle valve having communication with the pressure supply passage irrespective of the position of said manually operable valve.

3. The combination set forth in claim 2, wherein said piston is formed with passages which communicate with opposite end surfaces of said shuttle valve, and wherein said cylinder is formed with passages having communication with said valve guide, the construction and arrangement being such that the piston shuttle valve passages and the cylinder passages having communication with the valve guide are interconnected adjacent each end of the piston stroke so as to facilitate servo actuation of said shuttle valve to effect continuous piston reciprocation during motor operation.

4. A fluid motor including in combination, a cylinder, a reciprocable piston disposed in the cylinder capable of fluid pressure actuation in both directions, a shuttle valve carried by said piston and capable of fluid pressure actuation in both directions relative to said piston, said shuttle valve controlling the application of pressure fluid to said cylinder on opposite sides of said piston so as to effect continuous piston movement, said cylinder having a pressure supply passage, a drain passage and a valve guide which connects with said pressure supply passage, said piston and said shuttle valve having communication with said pressure supply and drain passages irrespective of the position of the piston within the cylinder, said piston having passages that connect with opposite end surfaces of said shuttle valve, said cylinder having passages which communicate with said valve guide, the construction and arrangement being such that said piston shuttle valve passages and said cylinder passages that communicate with the valve guide are interconnected adjacent each end of the normal piston stroke, and a manually operable control valve disposed in said valve guide for controlling motor operation, the construction and arrangement being such that said manually operable control valve may be positioned so as to block communication between at least one cylinder passage and said valve guide so as to prevent servo actuation of said shuttle valve in one direction whereby the stroke of said piston will be increased and operation of the motor interrupted.

5. A fluid motor including in combination, a cylinder, a piston disposed in said cylinder capable of fluid pressure actuation in both directions, reversing valve means carried by said piston and capable of fluid pressure actuation in both directions relative to said piston for directing pressure fluid to said cylinder on opposite sides of said piston to maintain said piston in a state of continuous movement throughout a predetermined stroke, means including mating fluid passages in said cylinder and said piston controlled by movement of said piston relative to said cylinder adjacent the ends of said predetermined piston stroke for supplying fluid pressure to and draining fluid pressure from opposite sides of said reversing valve means, and manually operable means to interrupt at least one of said mating passages in said cylinder to thereby interrupt the supply of pressure fluid to one side of said reversing valve means so that the stroke of said piston is increased in one direction and operation of the motor is interrupted.

References Cited in the file of this patent
UNITED STATES PATENTS

| | | |
|---|---|---|
| 397,958 | Barth | Feb. 19, 1889 |
| 403,601 | McAllister | May 21, 1889 |
| 565,391 | Rhodes | Aug. 4, 1896 |
| 746,206 | Viggers | Dec. 8, 1903 |
| 926,260 | Klein | June 29, 1909 |
| 1,130,671 | Criner | Mar. 2, 1915 |
| 1,145,449 | Walker | July 6, 1915 |
| 1,777,799 | Just | Oct. 7, 1930 |
| 2,241,004 | Sibley | May 6, 1941 |
| 2,272,033 | Buchmann | Feb. 3, 1942 |
| 2,341,195 | Svenson | Feb. 8, 1944 |
| 2,450,564 | Sacchini | Oct. 5, 1948 |
| 2,543,686 | Brown | Feb. 27, 1951 |
| 2,661,726 | Alfieri | Dec. 8, 1953 |
| 2,696,805 | Krohm | Dec. 14, 1954 |